(12) United States Patent
Tsujino et al.

(10) Patent No.: US 8,416,957 B2
(45) Date of Patent: Apr. 9, 2013

(54) AUDIO SOURCE DETECTION SYSTEM

(75) Inventors: Hiroshi Tsujino, Saitama (JP);
Kazuhiro Nakadai, Saitama (JP);
Hiroshi Okuno, Saitama (JP); Takeshi Mizumoto, Kyoto (JP); Ikkyu Aihara, Kyoto (JP)

(73) Assignee: Honda Motor Co., Ltd., Tokyo (JP)

( * ) Notice: Subject to any disclaimer, the term of this patent is extended or adjusted under 35 U.S.C. 154(b) by 418 days.

(21) Appl. No.: 12/631,434

(22) Filed: Dec. 4, 2009

(65) Prior Publication Data

US 2010/0189271 A1 Jul. 29, 2010

Related U.S. Application Data

(60) Provisional application No. 61/120,025, filed on Dec. 4, 2008, provisional application No. 61/158,413, filed on Mar. 9, 2009.

(51) Int. Cl.
*H04R 29/00* (2006.01)

(52) U.S. Cl. .............. 381/56; 381/124; 345/39; 345/46; 345/82; 362/612; 362/555

(58) Field of Classification Search .................. 381/124, 381/56, 306; 367/131–134; 362/612, 555; 345/39, 46, 82
See application file for complete search history.

(56) References Cited

U.S. PATENT DOCUMENTS 7,882,743 B2 * 2/2011 Goldberg et al. ............... 73/647
2008/0246833 A1 * 10/2008 Yasui et al. ................ 348/14.08

FOREIGN PATENT DOCUMENTS

JP 2007-142966 A 6/2007

OTHER PUBLICATIONS

Hiraoka et al., "Migration record of Japanese sea bass Lateorabrax japonicus using ultrasonic biotelemetry", Bulletin of the Japanese Society of Scientific Fisheries, 2003, vol. 69, No. 6, pp. 910-916. Mentioned on p. 2 of as-filed specification as a concise explanation of relevance.
Arai, "Welcome to Bio-Logging Science! (Highlights in Fisheries Science Research)", Bulletin of the Japanese Society of Scientific Fisheries, 2006, vol. 72, No. 4, pp. 752. Mentioned on p. 2 of as-filed specification as a concise explanation of relevance.
Koda et al., "Field Research of Wild Agile Gibbons inhabit in Sumatora, Indonesia; gibbon vocalizations", Primate Research, 2006, vol. 22, pp. 117-122. Mentioned on p. 2 of as-filed specification as a concise explanation of relevance.
Aihara et al., "Theoretical and Experimental Studies on Calling Behavior of Three Japanese Tree Frogs," Theory of Biomathematics and its Applications V, Research Institute for Mathematical Sciences, Sep. 2009, vol. 1663, pp. 153-158.

* cited by examiner

*Primary Examiner* — Disler Paul
(74) *Attorney, Agent, or Firm* — Chen Yoshimura LLP

(57) ABSTRACT

In a sound source localization system using a light emitting device for visualizing sound information, including: a light emitting device (40) including a microphone for receiving sound from a sound source (1, 2) and a light emitting means for emitting light based on the sound from the microphone; a generating section for generating light emitting information for the light emitting device (40); and a sound source localization section (60) for determining a position of the sound source based on the light emitting information from the generating section.

5 Claims, 9 Drawing Sheets

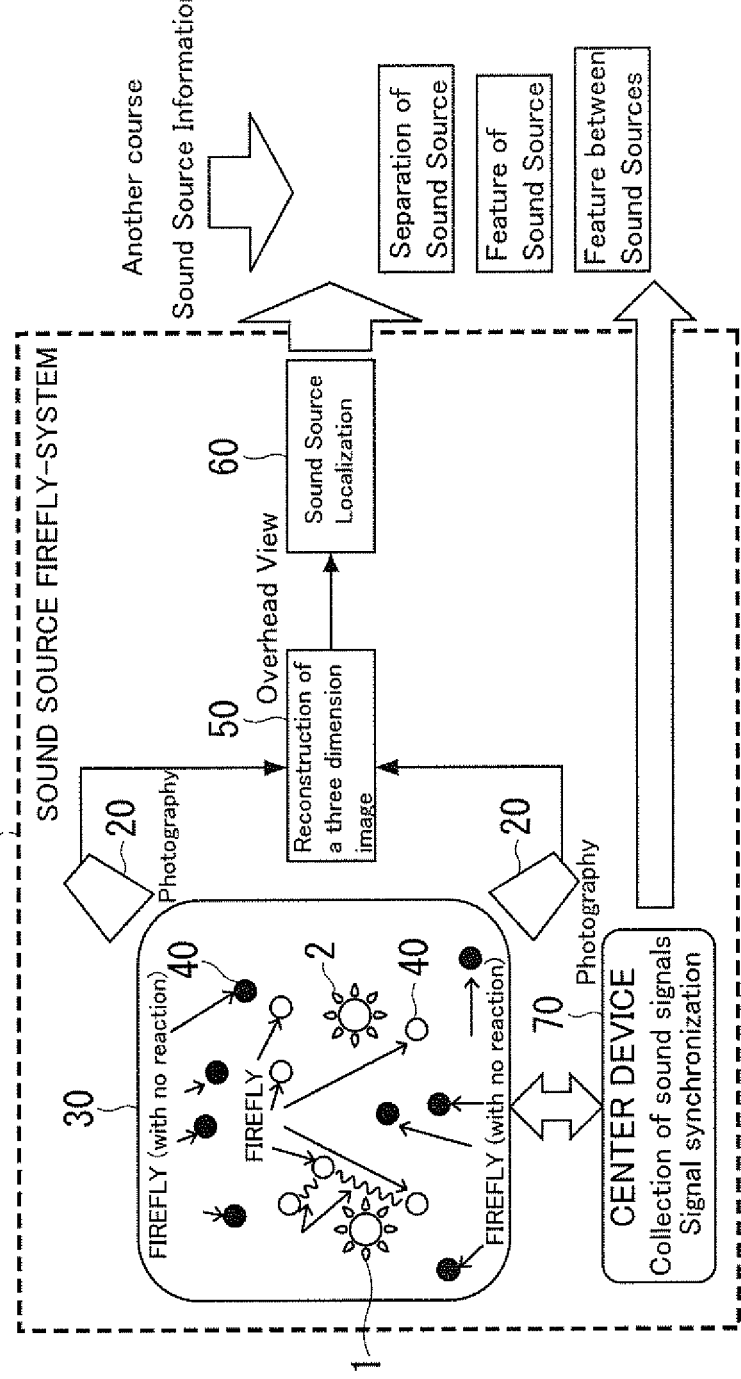

AUDIO SOURCE DETECTION SYSTEM

This application claims the benefit of Provisional Application of Ser. No. 61/120,025, filed on Dec. 4, 2008, and claims the benefit of Provisional Application of Ser. No. 61/158,413, filed on Mar. 9, 2009.

TECHNICAL FIELD

The present invention relates to a sound source localization system using a light emitting device that emits light in response to sound. Hereinafter, a light emitting device may be referred to as a Frog-Firefly and a sound source localization system may be referred to as a sound source Firefly-system.

BACKGROUND ART

Patent Literature 1 discloses a system that has a device for emitting light depending on the level of input sound and a means for capturing an image of the lighting device.

Mathematical modeling for the ribbit of Japanese tree frog (hereafter, referred to as a frog) has been conventionally studied (see Non Patent Literature 1). In those modeling studies for the ribbit, researchers conventionally have used audio data of frogs in a small area inside a building. For modeling study of frog behaviors in an outside field, localization of frogs in a field is essential.

CITATION LIST

Patent Literature

[Patent Literature 1] Japanese Unexamined Patent Publication No. 2007-142966

Non Patent Literature

[Non Patent Literature 1] Ikkyu Aihara, Ryu Takeda, Takeshi Mizumoto, Toru Takahashi, Hiroshi G. Okuno, "Experimental and Theoretical Studies on Synchronized Calling Behavior of Three Japanese Tree Frogs," *Theory of Bio Mathematics and Its Applications V,* 2009.

[Non Patent Literature 2] Yoshinori Hiraoka, Nobuaki Arai, Kenji Nakamura, Wataru Sakamoto, Hiromichi Mitamura, Yasushi Mitsunaga, Yoshihiro Yoneda, "Migration record of Japanese sea bass Lateorabrax japonicus using ultrasonic biotelemetry," *Bulletin of the Japanese Society of Scientific Fisheries*, Vol. 69, No. 6, pp. 910-916, 2003.

[Non Patent Literature 3] Nobuaki Arai, "Welcome to Bio-Logging Science! (Highlights in Fisheries Science Research)," *Bulletin of the Japanese Society of Scientific Fisheries*, Vol. 72, No. 4, p. 752, 2006.

[Non Patent Literature 4] Hiroki KODA and Chisako OYAKAWA, "Field Research of Wild Agile Gibbons inhabit in Sumatora, INDONESIA; gibbon vocalizations" *Primate Research* Vol. 22, pp. 117-122, 2006.

SUMMARY OF INVENTION

Technical Problem

However, Patent Literature 1 measures a sound pressure at a position at which the device is placed and does not indicate the position of a sound source.

Furthermore, it is difficult to adopt a visual inspection or radio telemetry instrumented with a radio transmitter, which are generally used for localization of wild animals (Non Patent Literatures 2 and 3). Because frogs are usually in the water of a rice field and they are too small, 3 to 4 cm, to be instrumented with a radio transmitter. Furthermore, the localization of organisms based on the ribbit has been made by human ears (Non Patent Literature 4). However, it is impossible to apply this method to frogs, the target creature, due to the population. In addition, most of conventional methods for sound source localization are for indoor environment and difficult to use in a field due to the following problems:

(1) The target range is very wide.
(2) An unlimited number of unknown noise sources exist.

Therefore, the sound source localization based on sound information only is difficult in the field.

In order to solve the disadvantages as described above, it is an objective of the present invention to provide a sound source localization system using a light emitting device for visualizing sound information.

Solution to Problem

In order to achieve the object, this invention provides a sound source localization system, comprising: a light emitting device including a microphone for receiving sound from a sound source and a light emitting means for emitting light based on the sound from the microphone; a generating section for generating light emitting information for the light emitting device; and a sound source localization section for determining a position of the sound source based on the light emitting information from the generating section.

In the sound source localization system, it is desired that the sound source localization section has a likelihood value setting section for setting a likelihood value that shows the existence of the sound source in a region within a distance of a predetermined value from the light emitting device and a labeling section for attaching a label based on the likelihood value, and a position of a gravity center of the label is estimated as the position of the sound source. The sound source localization section estimates the position of the sound source based on a periodicity of a temporal transition of the likelihood value.

In order to achieve the object, this invention provides a sound source localization system comprising an image capturing section, a plurality of light emitting devices provided in a dispersed manner in a field captured by the image capturing section, and a sound source localization section, wherein the light emitting device includes a microphone for receiving sound from a sound source in the field and a light emitting means for emitting light based on the sound from the microphone, when sound is emitted from the sound source in the field, light is emitted from the plurality of light emitting devices provided in the vicinity of the sound source and, based on images captured by the image capturing section of the plurality of light emitting devices from which light is emitted, the sound source localization section localizes a position of the sound source.

In order to achieve the object, this invention provides a sound source localization system comprising at least a pair of image capturing sections, a plurality of light emitting devices provided in a dispersed manner around a field captured by these image capturing sections, an image-constructing section, and a sound source localization section, herein when sound is emitted from a sound source, light is emitted from the plurality of light emitting devices provided in the vicinity of the sound source, the plurality of light emitting devices from which light is emitted are captured by the image capturing section and, based on the image prepared by the image capturing section, the image-constructing section prepares an overhead image and, based on the overhead image, the sound source localization section localizes a position of the sound source. In the sound source localization system, it is desired that the plurality of light emitting devices are provided around the field with an equal interval.

According to the present invention, modality conversion of audio information into visual information by a light emitting device and the sound source localization based on the visual information can be performed.

BRIEF DESCRIPTION OF THE DRAWINGS

FIG. 9 is a schematic view illustrating a sound source localization system according to the fourth example of the present invention.

DESCRIPTION OF THE PREFERRED EMBODIMENT

Hereinafter, an embodiment of the present invention will be described with reference to the drawings.

Figure 1:
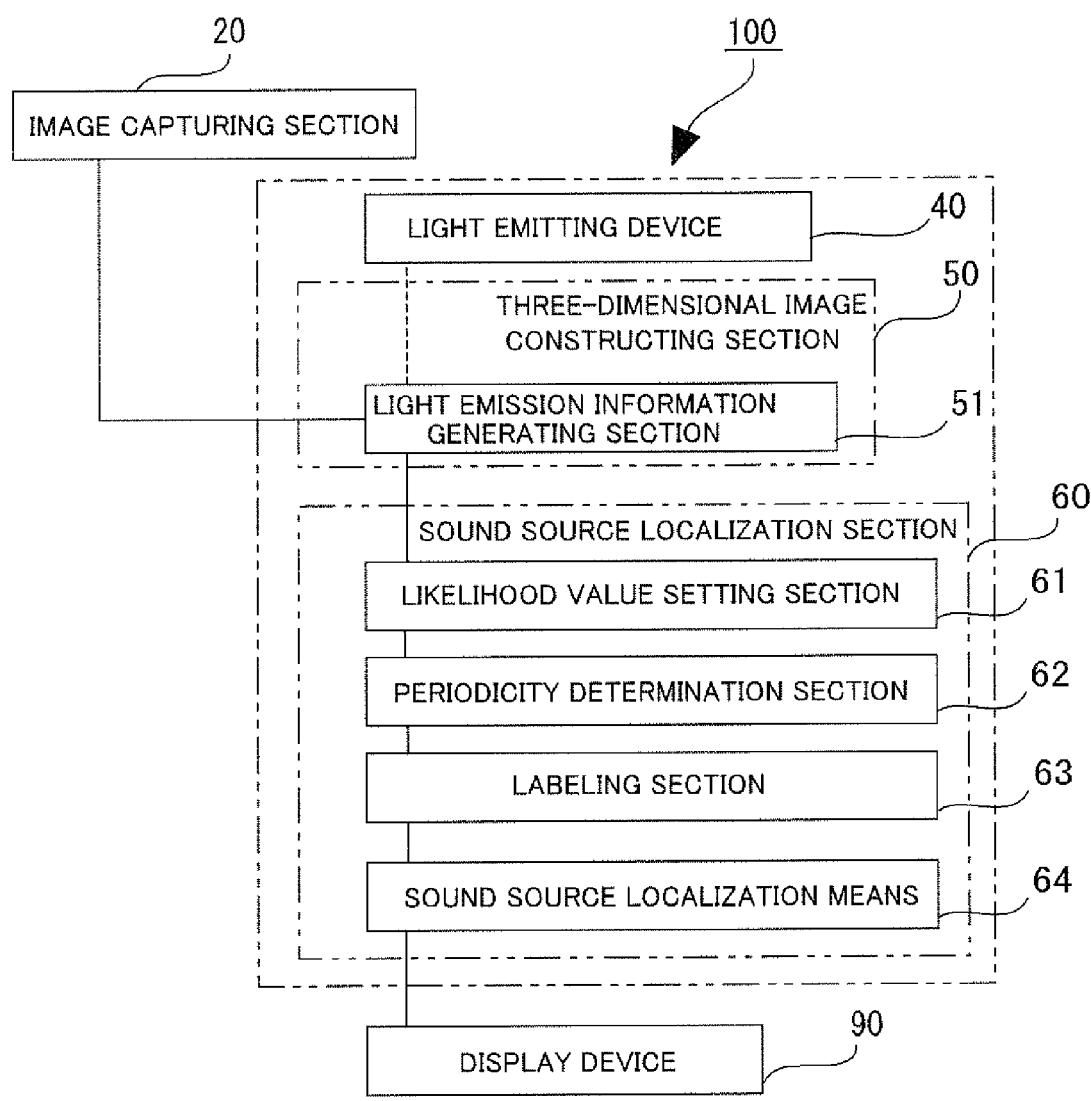
FIG. 1 is a schematic view illustrating a sound source localization system according to an embodiment of the present invention.

FIG. 1 illustrates a sound source localization system 100 according to an embodiment of the present invention. This sound source localization system 100 includes: an image capturing section 20, a plurality of light emitting devices 40, a three-dimensional image constructing section 50, and a sound source localization section 60.

Figure 2:
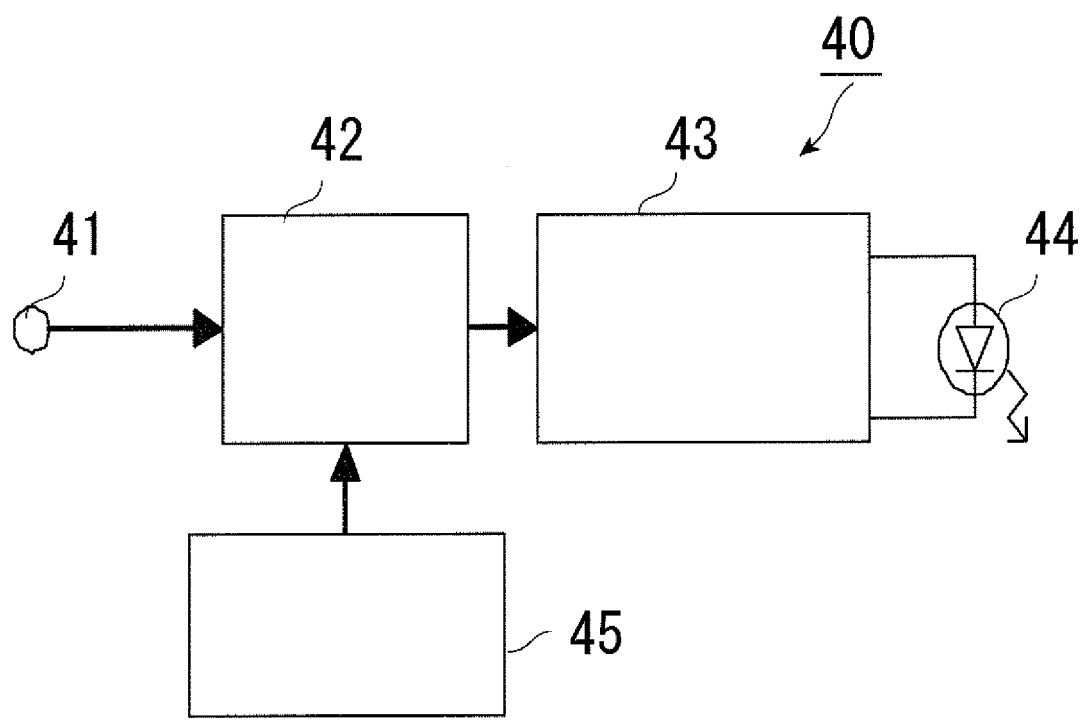
FIG. 2 is a block diagram illustrating a light emitting device according to an embodiment of the present invention.

Specifically, the light emitting device 40 includes, as shown in FIG. 2, a waterproof microphone 41, an amplifier circuit 42, a full-wave rectifier circuit 43, an LED 44, and a tuning volume 45. The light emitting device 40 amplifies a microphone input signal in the amplifier circuit 42, rectifies it into a full-wave, and pass it to LED 44.

It is assumed that the number of sound sources is F, sound source coordinates are $F_i=(x_i^{(f)},y_i^{(f)})$, (i=0 ... F−1), the number of the light emitting devices 40 is L, coordinates of the light emitting device 40 are $l_j=(x_j^{(l)},y_j^{(l)})$, (j=0 ... L−1), a sensitivity is $s_j$ and a variable indicating the blinking of the light emitting device 40 is $e_j$. As shown in the formula 1, with regard to $l_j$, of all light emitting devices 40, light is emitted from any light emitting device if the nearest sound source exists within a shorter distance than sensitivity $s_j$.

[Formula 1]

$$e_j = \begin{cases} 1 & \text{if } \min_i (\text{distance}(f_i, 1_j)) < s_j \\ 0 & \text{otherwise} \end{cases} \quad (1)$$

In the formula, the distance is a Euclidean distance as shown in the following formula (2).

[Formula 2]

$$\text{distance}(f_i, 1_j) = \sqrt{\left(x_i^{(f)} - x_i^{(l)}\right)^2 + \left(y_i^{(f)} - y_i^{(l)}\right)^2} \quad (2)$$

The three-dimensional image constructing section 50 has a light emission information generating section 51 as a generating section for generating the light emitting information for the light emitting device 40. The light emission information generation section 51 generates a three-dimensional image from an image captured by, for example, a pair of image capturing sections 20, and re-generates a two-dimensional overhead image based on the three-dimensional image. For example, the three-dimensional image constructing section 50 may use OpenCV for example to configure a three-dimensional space by a plurality of cameras to thereby prepare an overhead image.

The sound source localization section 60 localizes a sound source based on the overhead image prepared by the three-dimensional image constructing section 50. As shown in FIG. 1, the sound source localization section 60 includes: a likelihood value setting section 61, a periodicity determination section 62, a labeling section 63, and a sound source localization means 64.

The likelihood value setting section 61 performs a processing to allocate, in a two-dimensional image as an overhead image, a value showing a likelihood of existence of a sound source to a region within a distance having a predetermined value from the lighting device 40. Herein, adding a value to a region having a sound source in a two-dimensional image (specifically, a certain coordinate (x, y) in the image) is referred as "voting".

The periodicity determination section 62 calculates the periodicity of the voting number at a certain coordinate (x, y).

The labeling section 63 adds a label to a set of the certain coordinate (x, y) and another coordinate (x, y) that is neighboring to this coordinate (x, y) and that is polled to have a value so that this set can be differentiated from other sets.

With regard to the respective sets given with the respective labels, the sound source localization means 64 estimates the positions of sound sources.

Figure 3:
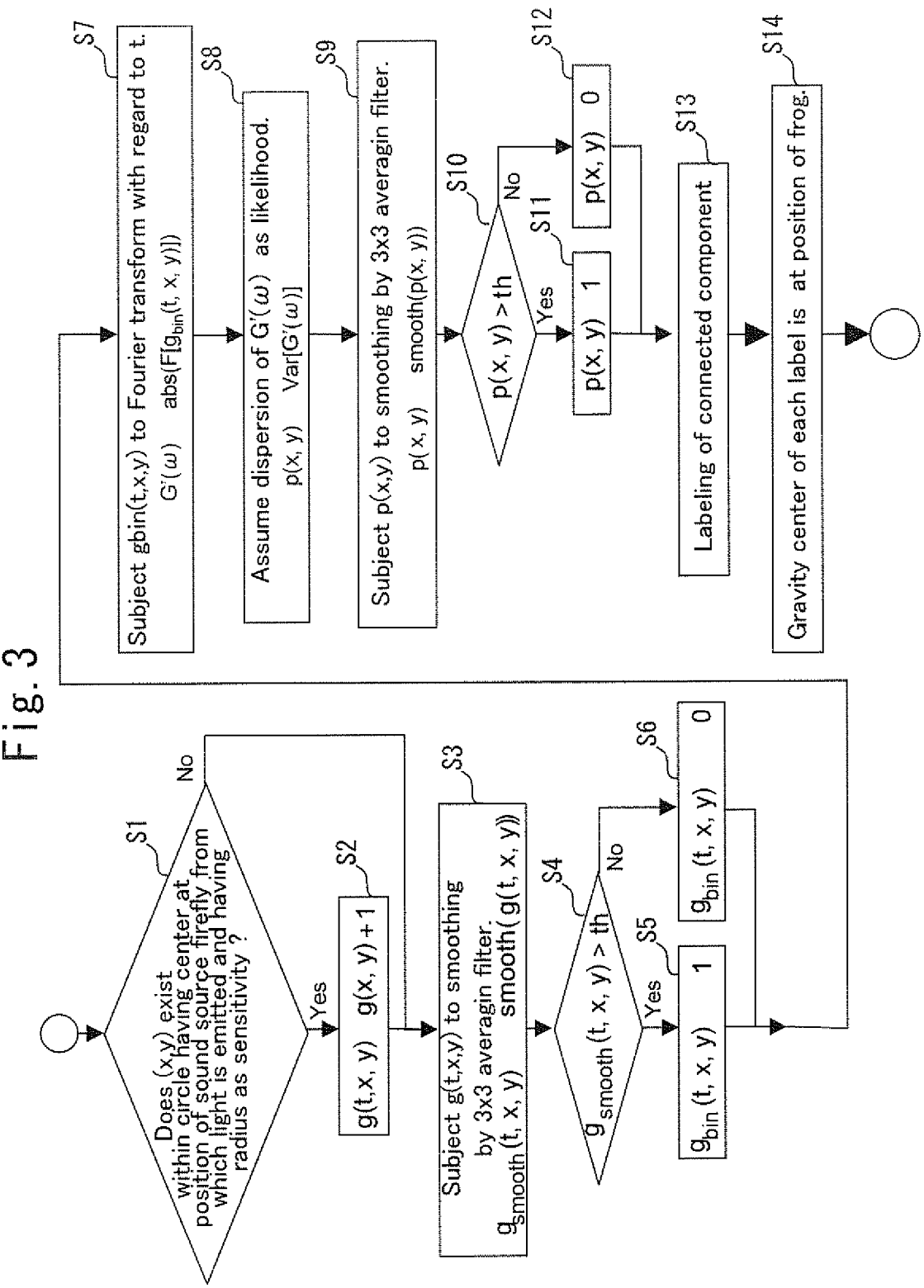
FIG. 3 is a flowchart illustrating a sound source localization method in a sound source localization system according to an embodiment of the present invention.

The following section will describe an algorithm for the sound source localization by the sound source localization section 60 of a sound source localization system 100 with reference to FIG. 2 and FIG. 3.

A sound source localization method based on a two-dimensional image will be described.

A sound source localization method of this embodiment estimates the position of a sound source based on a binary image showing the light from the light emitting device 40. In this case, the following conditions A to C are set.

A. Input: A binary image in which the position of a lighted light emitting device 40 has a point of 1 and the other positions have a point of 0.
B. Output: The position of a sound source
C. Assumption: (1) The distance between sound sources is sufficiently large. (2) The sound source exists at an end of a rectangular field.

This embodiment uses an approach using the voting of peripheral pixels of the lighting device 40. A two-dimensional image is represented by f(x, y) and the voting number to a two-dimensional image is represented by g(x, y).

The likelihood value setting section 61 determines whether each coordinate (x, y) of the two-dimensional image f(x, y) is at a position at which light is emitted from the light emitting device 40 (Step S1). Then, with regard to all points for which $f(x_0, y_0)$ is 1, the likelihood value setting section 61 increments by one g(x, y) in the circle having the radius r and having $g(x_0, y_0)$ at the center (Step S2). Next, the likelihood value setting section 61 subjects g(x, y) to the smoothing by a 3×3 moving average filter $(a_{ij})=1/9$ (Step S3).

Specifically, the likelihood value setting section 61 subjects the voting result g(t, x, y) to the smoothing by an averaging filter shown by the following formula (3).

[Formula 3]

$$g_{SMOOTH}(t, x, y) = \frac{1}{9} \sum_{i=x-1}^{x+1} \sum_{j=y-1}^{y+1} g(t, x+i, y+i) \quad (3)$$

Then, the likelihood value setting section 61 binarizes $g_{SMOOTH}(t, x, y)$. Specifically, the likelihood value setting section 61 uses the following formula (4) to binarize $g_{SMOOTH}(t, x, y)$ based on a threshold value th (Steps S4 to S6).

[Formula 4]

$$g_{bin}(t, x, y) = \begin{cases} 1 & \text{if } g_{SMOOTH}(t, x, y) > th \\ 0 & \text{otherwise} \end{cases} \quad (4)$$

Next, the periodicity determination section 62 calculates the temporal periodicity of each coordinate (x, y) of the two-dimensional image f(x, y).

The transition of the voting number of a certain coordinate (x', y') is shown by the following formula (5).

[Formula 5]

$$g'(t) = g_{bin}(t, x', y') \quad (5)$$

The periodicity determination section 62 subjects the g'(t) to Fourier transform with regard to the time t to thereby calculate the power spectrum G'(ω) (Step S7). In the formula, ω shows a frequency bin. Then, the periodicity determination section 62 calculates the dispersion of the power spectrum G'(ω) (Step S8).

[Formula 6]

$$p(x', y') = \frac{1}{T} \sum_{t=1}^{T} (G'(\omega) - \overline{G'(\omega)})^2 \quad (6)$$

When the periodicity calculation of all coordinates (x, y) is completed, then p(x, y) of the formula (6) shows the periodicity of the voting number at each position. Thus, p(x, y) is assumed as a periodicity-reflected likelihood.

The periodicity determination section 62 subjects the likelihood calculation result p(x, y) to the smoothing by the averaging filter shown by the following formula (7) (Step S9).

[Formula 7]

$$p_{SMOOTH}(x, y) = \frac{1}{9} \sum_{i=x-1}^{x+1} \sum_{j=y-1}^{y+1} p(x+i, y+i) \quad (7)$$

Then, the periodicity determination section 62 binarizes $p_{SMOOTH}(x, y)$. Specifically, the periodicity determination section 62 uses the following formula (8) to thereby binarize $p_{SMOOTH}(x, y)$ based on the threshold value th (Steps S10 to S12).

[Formula 8]

$$p'(x, y) = \begin{cases} 1 & \text{if } p_{SMOOTH}(x, y) > th \\ 0 & \text{otherwise} \end{cases} \quad (8)$$

The processing of smoothing and binarization to p(x, y) also may be performed by the labeling section 63.

Next, the labeling section 63 labels a connected component by attaching the same labels to neighboring points of p'(x, y) having a value of 1 (Step S13). However, regarding a region to which a label showing an area of $th_{area}$ or less was attached, the labeling section 63 removes the region as noise.

The sound source localization means 64 estimates the gravity center position of each label as a position of the sound source (Step S14). The gravity center is calculated by calculating an average of plane coordinates on each axis of points of the label. The position of the sound source is shown by a display device 90 such as a display.

With regard to the above three-dimensional image constructing section 50, the likelihood value setting section 61, the periodicity determination section 62, the labeling section 63, and the sound source localization means 64, by allowing a computer to execute software for example, the computer functions as the three-dimensional image constructing section 50, the likelihood value setting section 61, the periodicity determination section 62, the labeling section 63, and the sound source localization means 64.

According to the sound source localization system 100 of the embodiment as described above, the modality conversion of audio information into visual information by a light emitting device and the sound source localization based on visual information can be carried out.

First Example

Figure 4:
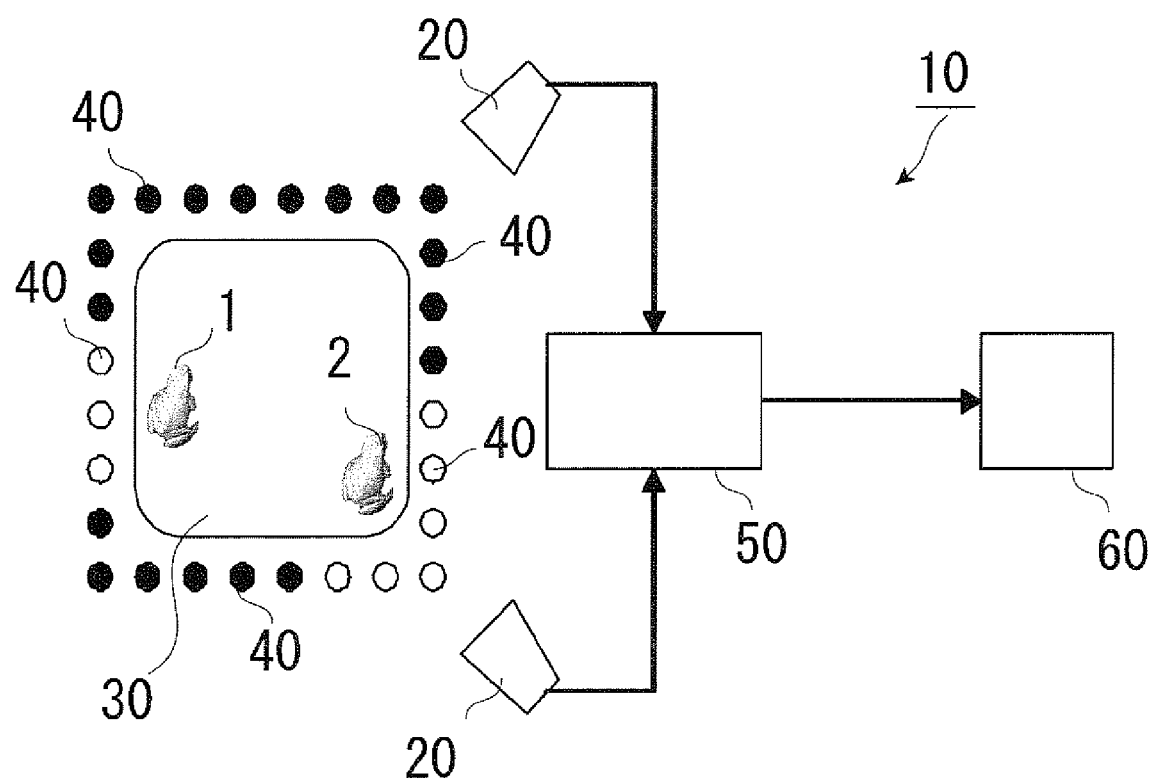
FIG. 4 is a schematic view illustrating a sound source localization system according to the first example of the present invention.

FIG. 4 illustrates a sound source localization system 10 according to the first example of the present invention. The sound source localization system 10 includes: at least a pair of image capturing sections 20; a plurality of light emitting devices 40 that are dispersedly provided around a field 30 captured by the image capturing sections 20; the three-dimensional image constructing section 50; and the sound source localization section 60.

In the sound source localization system 10, when sound is emitted from a sound source 1 and a sound source 2 within the field 30, then light is emitted from a plurality of light emitting devices 40 that are provided in the vicinity of the sound source 1 and the sound source 2. In FIG. 1, the white circle "○" shows a lighting device 40 and the black circle "●" shows a not lighting device 40. The plurality of lighting devices 40 are captured by the respective image capturing sections 20 and the images are prepared. Based on the images prepared by the image capturing sections 20, the three-dimensional image constructing section 50 reconstructs a three-dimensional image. Based on this three-dimensional image, the sound source localization section 60 localizes the position of the sound source.

As described above, according to the sound source localization system 10 of the first example, even when the sound from the sound source 1 and the sound source 2 is small, the sound from the sound sources 1 and 2 can be detected easily because a plurality of light emitting devices 40 are dispersedly provided around the field in which the sound sources 1 and 2 are fixed or move. Upon detecting the sounds from the sound sources, light is emitted from the plurality of light emitting devices 40. This emitted light can be captured by the image capturing section 20 to thereby prepare an overhead image. This overhead image shows a positional relation between the plurality of lighting devices 40. Based on this positional relation, the positions of the sound sources 1 and 2 can be localized.

The effectiveness of the sound source localization method of the first example was verified.

Figure 5:
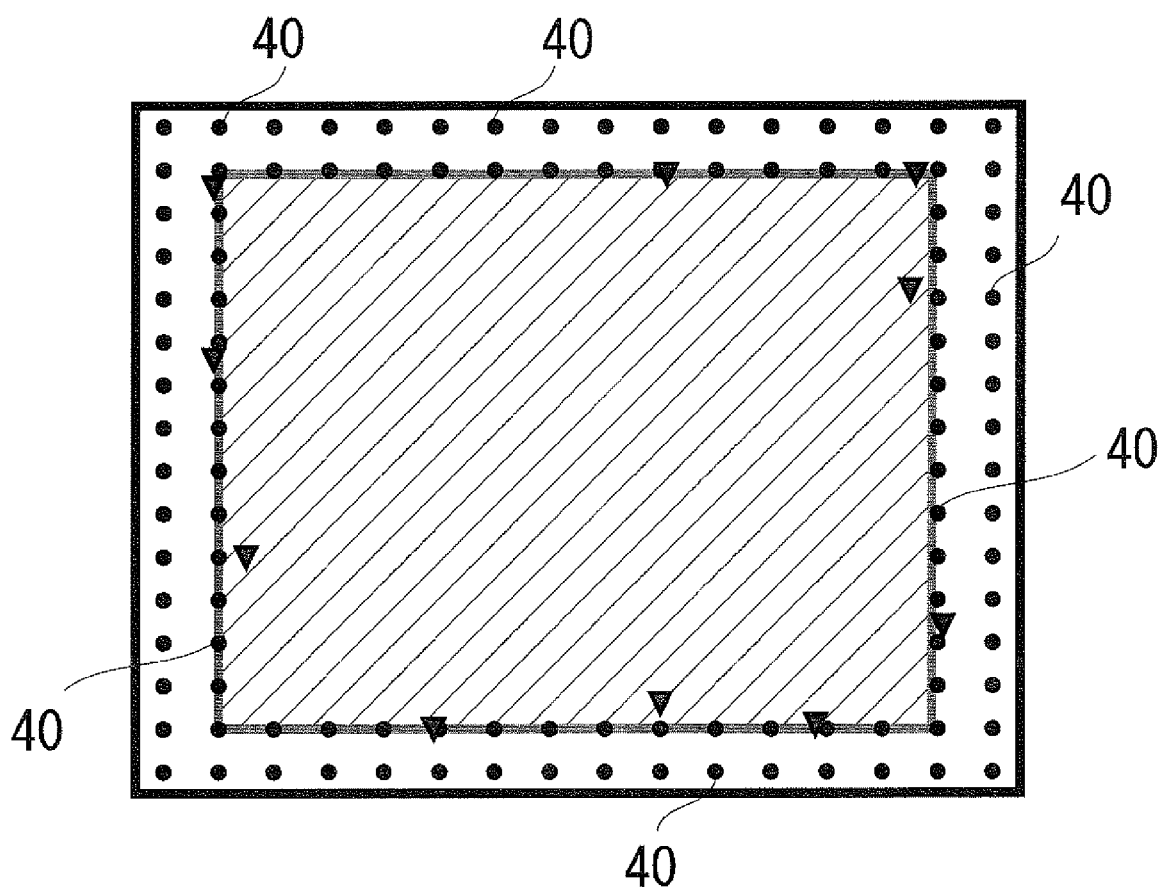
FIG. 5 is a simulation diagram illustrating a simulation of sound source localization method according to the first example.
Figure 6:
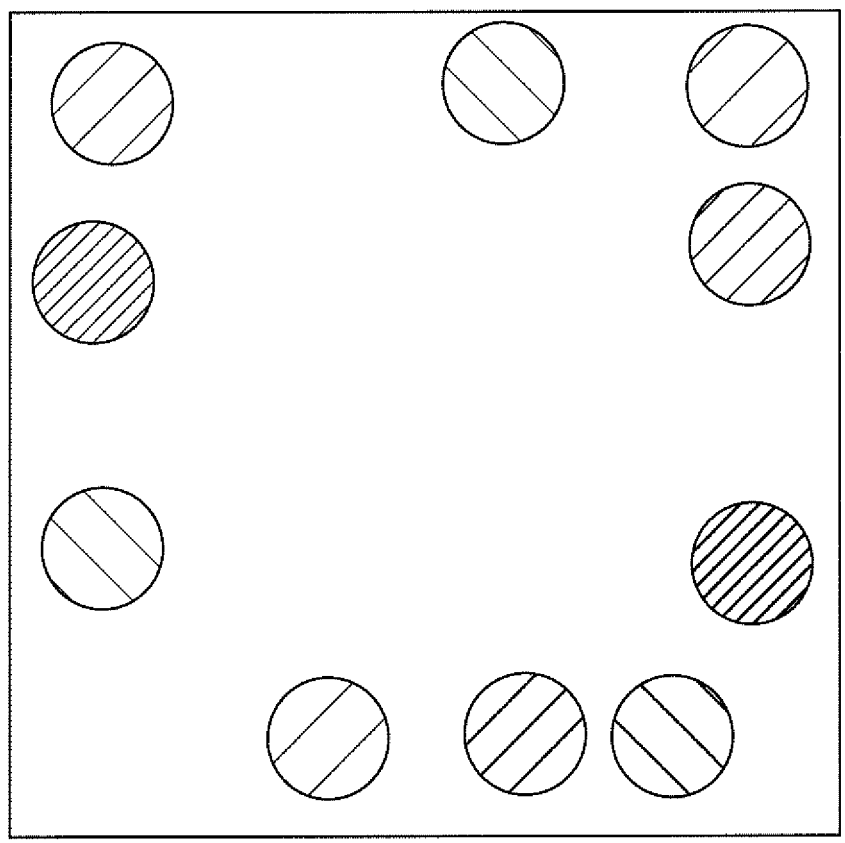
FIG. 6 is a simulation diagram illustrating an effect of sound source localization method according to the first example of the present invention.

The simulation situation is shown in FIG. 5. The labeling result is shown in FIG. 6.

In FIG. 5, the entire field is represented by 160×160 pixels. In the field, peripheral 15 pixels were assumed as a dike. The dike had thereon Frog-Fireflies (i.e., the light emitting devices 40) that are arranged in two columns. In the vicinity of the footpath and the rice field, 10 sound sources were provided to have a sufficient space thereamong. In FIG. 5, the mark "●" shows the light emitting device 40 and the mark "▼" shows a sound source. As shown in FIG. 5, the labeling of each sound source was successful. An average Euclidean distance was 3.8 pixels.

Second Example

Figure 7:
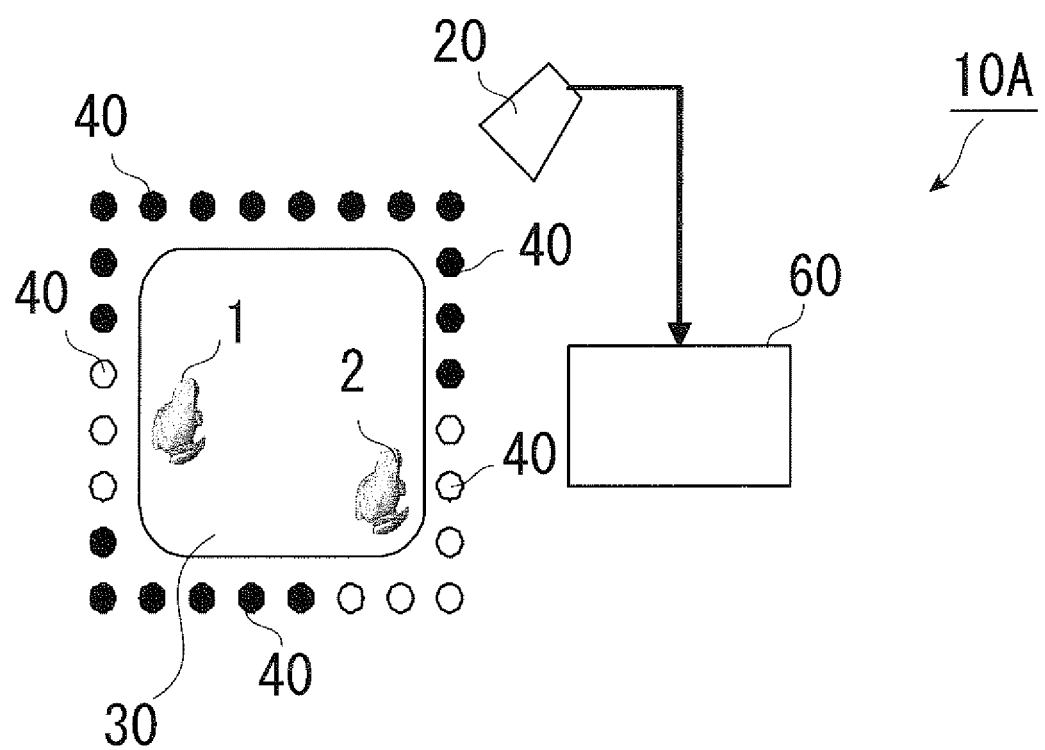
FIG. 7 is a schematic view illustrating a sound source localization system according to the second example of the present invention.

FIG. 7 is a block diagram illustrating the sound source localization system 10A according to the second example of the present invention. The sound source localization system 10A includes: a plurality of light emitting devices 40 dispersedly provided around the field 30; the image capturing section 20 (generating section) for generating the image of the field 30 (i.e., a two-dimensional image as light emitting information); and the sound source localization section 60 for determining the position of the sound source based on the two-dimensional image from the image capturing section 20 (generating section). The sound source localization section 60 determines the position of the sound source based on a two-dimensional image for each frame generated by the image capturing section 20 or each frame with a predetermined interval for example.

Third Example

Figure 8:
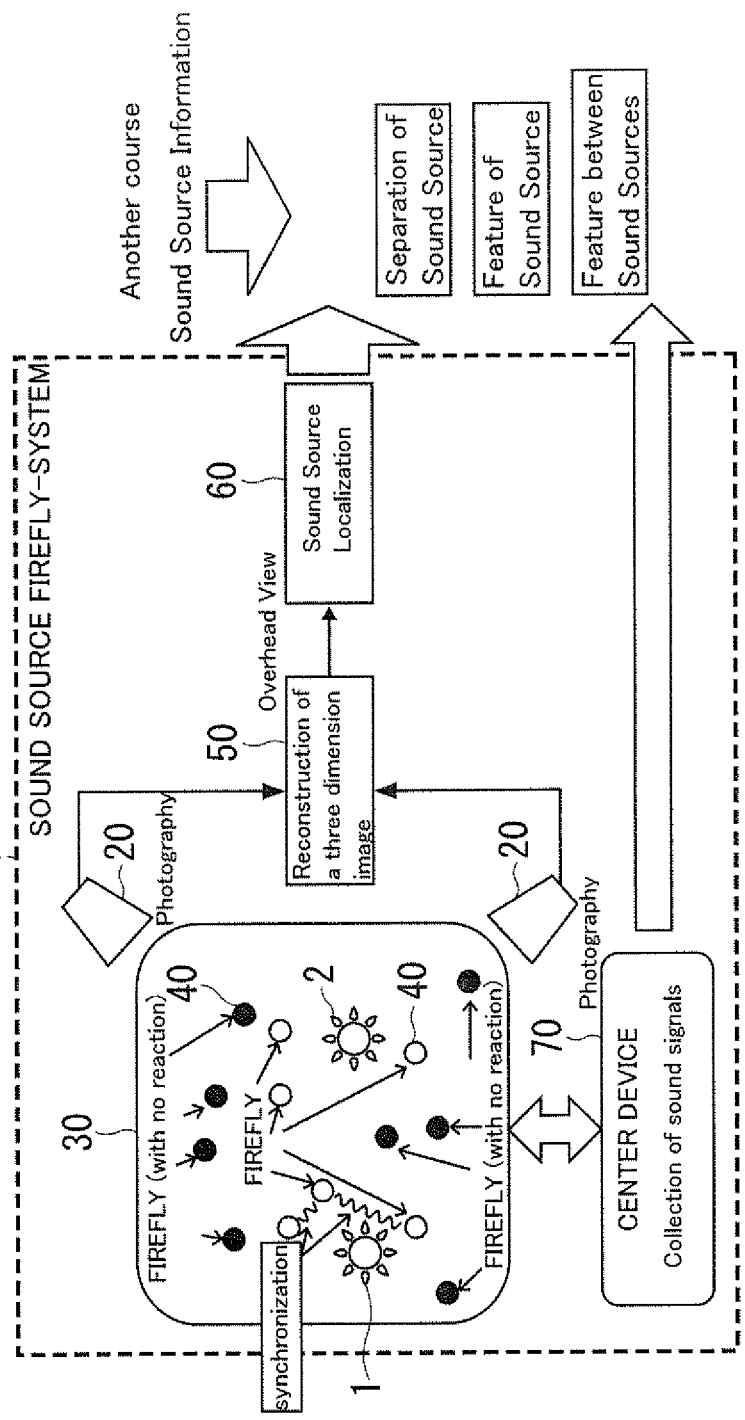
FIG. 8 is a schematic view illustrating a sound source localization system according to the third example of the present invention.

FIG. 8 is a block diagram illustrating the sound source localization system 10B according to the third example of the present invention.

The sound source localization system 10B includes: at least a pair of image capturing sections 20; a plurality of light emitting devices 40 dispersedly provided in the field 30 captured by these image capturing sections 20; the three-dimensional image constructing section 50; the sound source localization section 60; and a center device 70.

The center device 70 collects signals from the respective light emitting devices 40. For example, the respective light emitting devices 40 send sound signals to the center device 70. The center device 70 measures a time difference and a phase difference in the arrival of the signals from the respective sound sources.

Although not shown, this sound source localization system 10B additionally includes a sound collector such as a microphone array. Thus, the sound collected by the microphone array is sent to a processing device (not shown). This processing device separates for example the sounds from the plurality of sound sources collected by the microphone array based on the position of the sound source information calculated by the sound source localization section 60 as well as the time difference information and the phase difference information of the respective light emitting devices 40 measured by the center device 70 for example.

In the sound source localization system 10B, when sound is emitted from the sound source 1 and the sound source 2 within the field 30, then light is emitted from the plurality of the light emitting devices 40 provided in the vicinity of the sound source 1 and the sound source 2. The plurality of the lighting devices 40 are captured by the respective image capturing sections 20 and the two-dimensional images are prepared. Based on the two-dimensional images prepared by the respective image capturing sections 20, a three-dimensional image is reconstructed by the three-dimensional image constructing section 50. Based on this three-dimensional image, the position of the sound source is determined by the sound source localization section 60.

As described above, according to the sound source localization system 10B, even when the sounds from the sound sources 1 and 2 are small, the sounds from the sound sources 1 and 2 can be detected easily because a plurality of light emitting devices 40 are dispersedly provided within the field in which the sound sources 1 and 2 are fixed or move. Upon detecting the sounds from the sound sources, light is emitted from the plurality of light emitting devices 40. This emitted light can be captured by the image capturing section 20 to thereby prepare an overhead image. This overhead image shows a positional relation between the plurality of lighting sound source Fireflies. Based on this positional relation, the positions of the sound sources can be localized.

Fourth Example

FIG. 9 is a block diagram illustrating the sound source localization system 10C according to the fourth example of the present invention. The sound source localization system 10C of FIG. 9 has the same configuration as that of the third example except for the following point. Specifically, while the sound source localization system 10B of FIG. 6 is configured so that a plurality of light emitting devices 40 provided in the vicinity of the sound sources are synchronized, the sound source localization system 10C of FIG. 9 has a center device-synchronized configuration.

Adaptation Example

The following section will describe an adaptation example of the sound source localization system 10 in the first example 1 for example. In this example, the field 30 is a rice field and target organisms (i.e., the sound sources 1 and 2) are tree frogs. The rice field has a rectangular shape having one side of a few meters. The rice field is surrounded by footpath. Conventional investigations show that (1) tree frogs are roughly distributed with an interval of about 1 m, (2) tree frogs exist at the boundary between the rice field and a footpath, and (3) tree frogs behave not to move while emitting chip sound.

First, Frog-Fireflies, a device that emits light when sound exists in the vicinity thereof (i.e., the light emitting devices 40 which will be describe later) are provided in the footpaths of the rice field (see FIG. 4). Then, the blinking of the Frog-Fireflies is captured by a plurality of camcorders (i.e., the image capturing sections 20). Then, based on the captured images by the image capturing sections 20, the overhead image of the rice field is formed. Based on the overhead image, the positions of the sound sources 1 and 2 are estimated. The reason why a plurality of camcorders are used to obtain the overhead image is that the rice field is too wide to be directly captured by a single camcorder.

The light emitting device 40 is composed of an amplifier circuit and an LED. The light emitting device 40 operates so that light is emitted from the LED when sound is collected by the microphone. The design of the light emitting device 40 must satisfy the following requirements.

1. Low cost: Since there are rice fields of various sizes, the scalability of the system is important. Furthermore, since the target field exists in an open-air and waterfront environment, it is expected that the failure rate is high. Therefore, the individual device must achieve a low cost and must be added or exchanged as required.

2. Small size: Since the low cost means declined reliability, a plurality of devices must be combined and used. Devices must have a small size in order that many devices can be placed in footpaths. The small size also can promote the waterproofing in the requirement 3.

3. Waterproof: The devices must be waterproof because the devices are placed in a waterfront environment.

4. Availability of tuning: There are various kinds of frogs emitting different magnitudes of the ribbit. Furthermore, noise levels are also different depending on the environment in which the devices are used, thus requiring Frog-Fireflies to be tunable.

This device, Frog-Firefly, is composed of a small number of circuit components and use commercially-available chip parts. Therefore, Frog-Firefly satisfies the above requirements 1 and 2. Frog-Firefly also can satisfy the above requirement 3. The reason is that, since Frog-Firefly has a small size, Frog-Firefly can be waterproof by being covered by resin for example. Frog-Firefly also can be waterproof by using a waterproof microphone. The above requirement 4 can be satisfied by using a volume.

[Others]

Although the above example of application was based on an assumption that a sound source was a frog, the invention is not limited to this.

The light emitting devices arranged around the field are desirably provided with an equal interval.

Furthermore, in order to carry out the present invention, the method for reconfiguring overhead images from a plurality of camcorders must be verified and the devices must be used in an actual field in order to find any inconvenience. When sound sources exist in the close vicinity of one another, regions to be labeled have a contact to one another. Thus, a threshold value for binarization must be changed adaptively. Furthermore, a measure is also required to handle noise in a binarized image due to the noise during the reconfiguration of an overhead image for example.

The above-described image capturing section and three-dimensional image constructing section as a generating section are not limited to the above-described ones for generating a two-dimensional image and a three-dimensional image. The above-described image capturing section and three-dimensional image constructing section also may be configured to receive a signal sent from a light emitting device to prepare, based on this signal, such information that shows from which light emitting device light is emitted. For example, the generating section has position information on the field of each light emitting device.

In the present invention, the imaging step also may follow a calibration step. Prior to placing a light emitting device for recording, an initialization calibration can be performed to cause all light emitting devices to emit light and the light is imaged. This calibration step can limit the positions of the respective light emitting devices to thereby remove the noise due to light caused by the reflection from factors other than the light emitting devices. In the case of a field having a known fixed positional relation among light emitting devices (e.g., a field in which light emitting devices are provided on a plate, a sheet, or a net), the geometrical relationship thereamong is known. Thus, an image based on light emitted from all light emitting devices can be subjected to a three-dimensional geometrical conversion to obtain an overhead image without depending on the inclination of the actual field and a camcorder angle.

What is claimed is:

1. A sound source localization system, comprising:
    a light emitting device including a microphone for receiving sound from a sound source and a light emitting means for emitting light based on the sound from the microphone; and
    one or more processors programmed to include a generating section and a sound source localization section,
    wherein the generating section generates light emitting information for the light emitting device; and
    wherein the sound source localization section determines a position of the sound source based on the light emitting information from the generating section,
    wherein the sound source localization section has a likelihood value setting section for setting a likelihood value that shows the existence of the sound source in a region within a distance of a predetermined value from the light emitting device and a labeling section for attaching a label based on the likelihood value, and a position of a gravity center of the label is estimated as the position of the sound source.

2. The sound source localization system according to claim 1,
    wherein the sound source localization section estimates the position of the sound source based on a periodicity of a temporal transition of the likelihood value.

3. A sound source localization system comprising an image capturing section, a plurality of light emitting devices dispersedly provided in a field captured by the image capturing section, and a sound source localization section,
    wherein the light emitting device includes a microphone for receiving sound from a sound source in the field and a light emitting means for emitting light based on the sound from the microphone,
    wherein when sound is emitted from the sound source in the field, light is emitted from the plurality of light emitting devices provided in the vicinity of the sound source and, the sound source localization section localizes the sound source on the basis of images that a plurality of lighting devices is captured by the image capturing section, and wherein the sound source localization section has a likelihood value setting section for setting a likelihood value that shows the existence of the sound source in a region within a distance of a predetermined value from the respective light emitting device and a labeling section for attaching a label based on the likelihood value, and a position of a gravity center of the label is estimated as the position of the sound source.

4. A sound source localization system comprising at least a pair of image capturing sections, a plurality of light emitting devices dispersedly provided around a field captured by these image capturing sections, an image-constructing section, and a sound source localization section, wherein when sound is emitted from a sound source, light is emitted from the plurality of light emitting devices provided in the vicinity of the sound source, the plurality of lighting device are captured by the image capturing section, the image-constructing section prepares an overhead image on basis of the image prepared by the image capturing section and, the sound source localization section localizes a position of the sound source on basis of the overhead image, and wherein the sound source localization section has a likelihood value setting section for setting a likelihood value that shows the existence of the sound source in a region within a distance of a predetermined value from the respective light emitting device and a labeling section for attaching a label based on the likelihood value, and a position of a gravity center of the label is estimated as the position of the sound source.

5. The sound source localization system according to claim 4, wherein the plurality of light emitting devices are provided around the field with an equal interval.

* * * * *